US006933973B1

(12) United States Patent
Sako

(10) Patent No.: US 6,933,973 B1
(45) Date of Patent: Aug. 23, 2005

(54) CMOS IMAGE SENSOR HAVING BLOCK SCANNING CAPABILITY

(75) Inventor: Norimitsu Sako, Tokyo (JP)

(73) Assignee: Kawasaki Microelectronics, Inc., Chiba (JP)

( * ) Notice: Subject to any disclaimer, the term of this patent is extended or adjusted under 35 U.S.C. 154(b) by 0 days.

(21) Appl. No.: 09/515,504

(22) Filed: Feb. 29, 2000

(30) Foreign Application Priority Data

Mar. 1, 1999 (JP) ................................. 11-052457

(51) Int. Cl.$^7$ .................... H04N 5/335; H04N 5/217
(52) U.S. Cl. ................... 348/308; 348/241; 348/302
(58) Field of Search .................. 348/308, 214, 348/302, 222.1, 307, 294, 318, 241; 250/208.1, 250/367

(56) References Cited

U.S. PATENT DOCUMENTS

| 4,910,688 | A |   | 3/1990  | Amini |
| 4,968,386 | A |   | 11/1990 | Nguyen |
| 5,094,718 | A |   | 3/1992  | Friend |
| 5,128,769 | A | * | 7/1992  | Arai et al. ................. 348/363 |
| 5,452,004 | A | * | 9/1995  | Roberts ..................... 348/301 |
| 5,583,950 | A |   | 12/1996 | Prokoski |
| 5,742,047 | A | * | 4/1998  | Buhler et al. ........... 250/214 R |
| 5,815,198 | A |   | 9/1998  | Vachtsevanos et al. |
| 5,949,483 | A | * | 9/1999  | Fossum et al. ............. 348/303 |
| 6,008,486 | A | * | 12/1999 | Stam et al. .............. 250/208.1 |
| 6,018,365 | A | * | 1/2000  | Merrill ...................... 348/302 |
| 6,130,423 | A | * | 10/2000 | Brehmer et al. ......... 250/208.1 |
| 6,133,563 | A | * | 10/2000 | Clark et al. ............. 250/208.1 |
| 6,166,767 | A | * | 12/2000 | Watanabe .................... 348/301 |
| 6,175,383 | B1 | * | 1/2001 | Yadid-Pecht et al. ....... 348/302 |
| 6,326,230 | B1 | * | 12/2001 | Pain et al. ..................... 438/57 |
| 6,452,632 | B1 | * | 9/2002 | Umeda et al. .............. 348/294 |
| 6,512,858 | B2 | * | 1/2003 | Lyon et al. ................. 382/305 |
| 6,549,234 | B1 | * | 4/2003 | Lee ............................. 348/302 |
| 2001/0005225 | A1 | * | 6/2001 | Clark et al. ................. 348/302 |

OTHER PUBLICATIONS

Sunetra K. Mendis et al., "CMOS Active Pixel Image Sensors for Highly Integrated Imaging System," Journal of Solid-State Circuits, vol. 32, No. 2, Feb. 1997, pp. 187-197.
Shoiji Kawahito et al., "A CMOS Image Sensors for Focal-plane Compression using Analog 2-D DCT Circuits and an Adaptive Resolution A/D Converter," Proceedings of the Institute of Image Information and Television Engineers, vol. 52, No. 2, pp. 206-213 (1998).

* cited by examiner

*Primary Examiner*—Tuan Ho
*Assistant Examiner*—Lin Ye
(74) *Attorney, Agent, or Firm*—Oliff & Berridge, PLC

(57) ABSTRACT

A CMOS image sensor includes a plurality of pixel sensors arranged in a two-dimensional array. In each pixel sensor, a signal corresponding to the absolute value of the amount of incident light with reduced reset noise is obtained. The signals of the respective pixel sensors are then output in a block scanning fashion. The CMOS image sensor does not need to include a preprocessing circuit for discrete cosine transform or a high-capacity frame memory for raster scanning.

12 Claims, 18 Drawing Sheets

CMOS IMAGE SENSOR HAVING BLOCK SCANNING CAPABILITY

BACKGROUND OF THE INVENTION

1. Field of Invention

The present invention relates to a CMOS image sensor, and, more particularly, to a CMOS image sensor that outputs data in a block scanning fashion, which can process without needing a preprocessing operation.

2. Description of Related Art

In an image system using an image sensor such as a CCD, raster scanning as shown in FIG. 1 is used because of the limitation associated with the device. When a still image is compressed according to the JPEG standard, which is a widely used standard, or when a moving image is compressed according to the MPEG standard, which is also widely used, Discrete Cosine Transform (DCT) is performed for a unit (block) including 8 pixels in a row by 8 pixels in a column. To this end, data associated with all pixels is first stored into a high-capacity frame memory, and then block-scanning is performed as shown in FIG. 2.

CMOS image sensors are now receiving attention because of their advantages over CCD image sensors. In a paper entitled "CMOS Active Pixel Image Sensors for Highly Integrated Imaging System," Sunetra K. Mendis et al., Journal of Solid-State Circuits, Vol. 32, No. 2, February 1997, pp. 187–197, a pixel sensor is disclosed which includes a photogate PG having a floating diffusion (FD) output FD isolated by a transfer gate TX, as shown in the circuit diagram of FIG. 3 and also in the timing chart of FIG. 4. In addition to the photogate PG, this pixel sensor also includes a reset transistor MR, an in-pixel source follower MIN, and a row selection transistor MX.

A reading circuit is used in common for all pixels in the same row. Each reading circuit includes a load transistor MLN of a first source follower, and two sample-and-hold circuits for storing a signal voltage and a reset voltage, respectively. To reduce random noise or fixed pattern noise in the pixel sensor and the reading circuit, it is effective to perform correlated double sampling in which a reset voltage containing noise and a signal voltage containing the same noise are sampled in a short period of time during which the noise in the reset voltage and the noise in the signal voltage have strong correlation with each other, and the reset voltage is subtracted from the signal voltage. By this correlated double sampling, it is possible to suppress reset noise and 1/f noise contained in the signal output from floating diffusion node of the pixel and also suppress a variation in threshold of the in-pixel source follower.

Each sample-and-hold circuit includes sample-and-hold switches MSHS and MSHR, and capacitors CS and CR. To buffer capacitor voltages and read them out via a horizontal bus having high capacitance, each sample-and-hold circuit further includes row source followers MP1 and MP2 and row selection transistors MY1 and MY2. Load transistors MLP1 and MLP2 of the row source followers are used in common for all pixels in a pixel array. In a row reading circuit, a p-channel source follower is used to compensate for a change in the signal voltage caused by an n-channel source follower in a pixel.

The operation of the CMOS image sensor is performed as shown in FIG. 5. That is, first, power supply voltages VDD and VSS are set to 5 V and 0 V, respectively, and the transfer gate TX is biased to 2.5V. The load transistor MLN of the in-pixel source follower and the load transistors MLP1 and MLP2 of the row source followers are biased to DC voltages of 1.5 and 2.5 V, respectively.

During a signal accumulation period shown in FIG. 5A, electrons generated by light are accumulated in the surface channel photogate PG biased at 5 V. Herein, the reset transistor MR is biased at 2.5 V so that it serves as a lateral antiblooming drain into which an excess signal charge is drained. On the other hand, the column selection transistor MX is biased at 0 V. After accumulating the signal charges, the signal charges of pixels are read on a column-to-column basis.

More specifically, first, pixels in a particular column are addressed by turning on a corresponding column selection switch MX. Then, as shown in FIG. 5B, the reset gate MR of a pixel is temporarily set to 5 V thereby resetting the floating diffusion output node FD of that pixel. As a result, the floating diffusion output FD is reset to about 3.5 V.

The sample-and-hold switch MSHR is turned on thereby sampling the output of the first source follower and holding it in the capacitor CR. Then, as shown in FIG. 5C, the bottom of the potential well of the photogate PG is temporarily raised so as to transfer the charge accumulated by the photocurrent to FD. Then, as shown in FIG. 5D, the sample-and-hold switch MSHS is turned on thereby holding the signal voltage of FD in the capacitor CS of the reading circuit.

The row selection switches MY1 and MY2 are then turned on sequentially so that the reset voltage and the signal voltage held are read sequentially via the second source follower.

Finally, The FD reset signal R and the transfer signal TX are temporally turned on, thereby resetting the photodiode and again inputting light.

In the paper titled "Image Compression CMOS Image Sensor Based on an Analog Two-Dimensional DCT Circuit and an Accuracy Adaptive A/D Converter," presented by Shoji Kawato et al. in Proceedings of the Institute of Image Information and Television Engineers, Vol. 52, No. 2, pp. 206–213 (1998), a CMOS image sensor is disclosed in which an analog two-dimensional DCT circuit is integrated with the CMOS image sensor so that image compression is performed on the image sensor. In this CMOS image sensor, as shown in FIG. 6, two pass transistors Tv and Th are connected in series to a photodiode PD of a pixel sensor 10. One pass transistor (Tv) is activated by a row block selection signal Vscan output from a row (vertical) block scanner Vs, and the other pass transistor (Th) is activated on a column-to-column basis by a column selection signal Hscan output from a column (horizontal) scanner Vh, thereby addressing eight pixels so as to read a signal on a block-to-block basis and directly perform two-dimensional DCT operation in an analog area.

In a peripheral circuit, there are disposed a plurality of pass transistors (coupling transistors) Tc, which are selected on a block-to-block basis. Signal charges of a photodiode PD serving as photosensors are sequentially transferred via a total of three pass transistors Tv, Th, and Tc to feedback capacitors Cf1 and Cf2 of a two-stage amplifier including stages A1 and A2 in a reading circuit SCC based on a switched capacitor technique.

The output of the reading circuit SCC is subjected to an analog operation in the two-dimensional DCT circuit (not shown) and then converted from analog form into digital form.

In FIG. 6, ISA denotes an image sensor array.

A problem of the former known technique described above is that reading cannot be performed on a block-to-block basis.

On the other hand, in the latter known technique described above, the photodiode cannot be reset, and thus there is large random noise. Furthermore, because the signal voltage is not amplified in the pixel sensor 10 shown in FIG. 6, the signal is inevitably contaminated with 1/f noise when being passed through three pass transistors, and also contaminated with coupling noise when being transmitted via a long interconnection line to the peripheral circuit. Another problem is that color correction and motion detection are impossible, because only analog data subjected to two-dimensional DCT operation is available.

SUMMARY OF THE INVENTION

In view of the above-described problems of the known techniques, it is an object of the present invention to provide a CMOS image sensor that can output a signal containing reduced random noise in a block scanning fashion without needing either a block scanning circuit or a high-capacity frame memory for raster scanning.

An exemplary embodiment of a CMOS image sensor according to the present invention comprises pixel sensors arranged in a two-dimensional array. The CMOS image sensor further comprises means, disposed in each pixel sensor, for obtaining a signal whose reset noise is reduced and that corresponds to the absolute value of the amount of incident light; and means for outputting the signal in a block-scanning fashion.

An exemplary embodiment of a pixel sensor for use in a CMOS image sensor according to the present invention comprises a photodiode at a signal detection node; and a pair of pass transistors that passes a photodiode reset signal to the gate of a transistor that resets the photodiode, only when the pixel sensor is selected.

Another exemplary embodiment of a CMOS image sensor according to the present invention comprises the above-described pixel sensors. The pixel sensors are disposed in a two-dimensional array, and the photodiode reset signal is given as the logical AND of a column block selection signal and a pixel reset signal.

Another exemplary embodiment of a pixel sensor according to the present invention comprises floating diffusion at a signal detection node. The pixel sensor further comprises a pair of pass transistors that passes a transfer signal to the gate of a transistor that resets the photodiode, only when the pixel sensor is selected.

In the CMOS image sensor comprising the above-described pixel sensors arranged in a two-dimensional array, the transfer signal is preferably given as the logical AND of a column block selection signal and a pixel transfer signal.

Another exemplary embodiment of a CMOS image sensor according to the present invention comprises photogate-type pixel sensors arranged in a two-dimensional array. The CMOS image sensor further comprises a pair of pass transistors for passing a photogate control signal thereby transferring a signal charge, only when a corresponding row is selected; and a pair of pass transistors for passing a pixel transfer signal thereby allowing a signal charge to be transferred, only when a corresponding column block is selected.

In this CMOS image sensor, it is desirable that the pixel transfer signal fall down before the photogate control signal rises up.

The CMOS image sensor can further comprise means for selectively connecting the output of a pixel sensor to a circuit for reading one row of block.

An exemplary embodiment of a camera according to the present invention can automatically control brightness. The camera comprises the above-described CMOS image sensor; means for estimating the average brightness over the entire screen of the CMOS image sensor from brightness detected for the several blocks in a central area and in a peripheral area of the screen; and a programmable gain amplifier whose gain is automatically controlled in accordance with the estimated brightness.

An exemplary embodiment of a monitor camera according to the present invention comprises the above-described CMOS image sensor; means for detecting whether there is a substantial change in an image by reading several blocks in a central area and in a peripheral area of an image screen of the CMOS image sensor; and means for continuously taking an image over the entire screen when a substantial change is detected.

An exemplary embodiment of an autofocus camera according to the present invention comprises the above-described CMOS image sensor; and means for adjusting focus by reading several blocks in a central area of an image screen of the CMOS image sensors, and taking an image over the entire screen after completion of the focus adjustment.

In the present invention, resetting can be performed within the respective pixel sensors. Furthermore, signal voltages can be amplified within the respective pixel sensors. When a signal is output in a block scanning fashion, the resetting operation and the transferring operation of a particular pixel sensor do not affect other pixel sensors.

The voltages output from pixel sensors in a block (including, for example, 8 pixels in a row×8 pixels in a column) are output as an analog signal in a block scanning fashion. The output signal is applied to a programmable gain amplifier (PGA) and then converted by an A/D converter to digital data.

Each pixel sensor can be constructed of a minimum required number of elements depending on the type of the pixel sensor. The circuit configuration of the pixel sensor can be optimized for the total circuit including the peripheral circuit.

DETAILED DESCRIPTION OF PREFERRED EMBODIMENTS

The present invention is described below in detail with reference to preferred embodiments in conjunction with the accompanying drawings.

In circuit design and layout design for a pixel sensor, which is a unit of an area sensor, the following issues should be considered:

(1) The quantum efficiency should be sufficiently large. To this end, one important factor is a large aperture ratio.
(2) Random noise, which can cause a problem in particular in a CMOS image sensor, should be minimized.
(3) In order to fit a great number of pixel sensors in the form of an array, the size of each pixel sensor should be as small as possible.
(4) To minimize the size of the pixel sensor, each pixel sensor includes a single well and a single transistor.
(5) The number of elements, such as transistors, should be minimized.
(6) The number of interconnections to each pixel sensor should be minimized.
(7) An irregular arrangement of pixels causes spatial distortion. Accordingly, it is desirable to use a layout in which pixels are equally spaced from each other in both vertical and horizontal directions except for at the periphery of the array.

To perform block scanning, the pixel sensor should satisfy the following requirements.

(8) Signal charges of pixel sensors in a block, which is not selected, are not influenced by an address selection signal, a reset signal, a transfer signal, and other signals.
(9) Even in a selected block, a signal charge of a pixel sensor, whose address selection signal is not active, is not influenced by the reset signal or the transfer signal.

Furthermore, to perform block scanning, the peripheral circuit should satisfy the following requirements.

(1) To output signals of a plurality of pixels (eight pixels, for example) in parallel for each row, a column block selection signal is used to select particular columns so that only those pixel sensors are handled which are located at intersections between a particular row designated by an address selection signal and the columns designated by the column block selection signal.
(2) Signal lines extending in a horizontal direction along rows in an array of pixel sensors (and signal lines extending in a vertical direction along columns) are used in common for pixel sensors in the respective signal lines.
(3) Each pixel sensor is constructed of a minimum possible number of elements such that each pixel can be controlled by the peripheral circuit.

Figure 1:
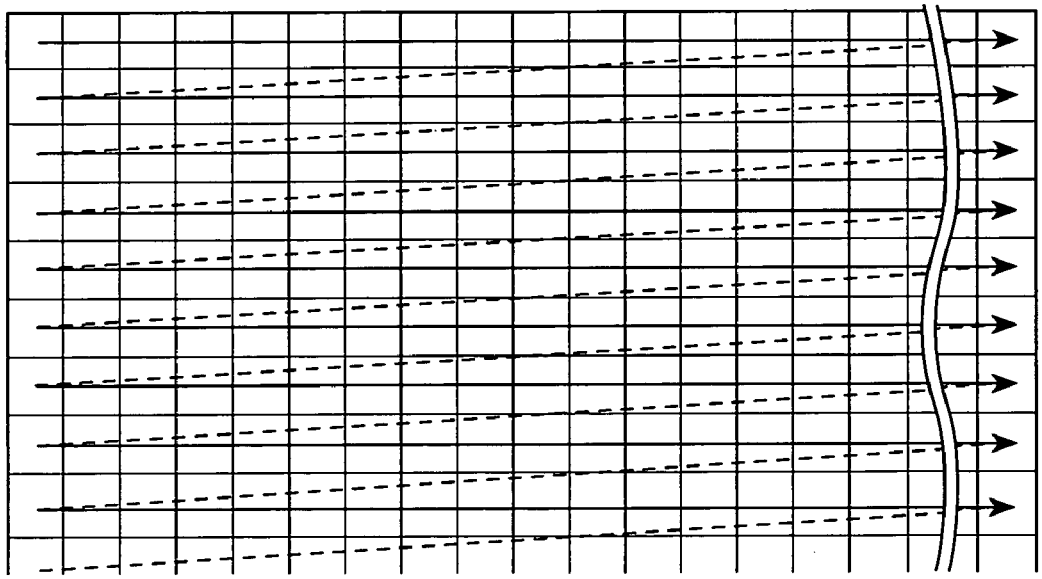
FIG. 1 is a schematic diagram illustrating a problem in scanning image data in a raster scanning fashion that is solved by the present invention.
Figure 2:
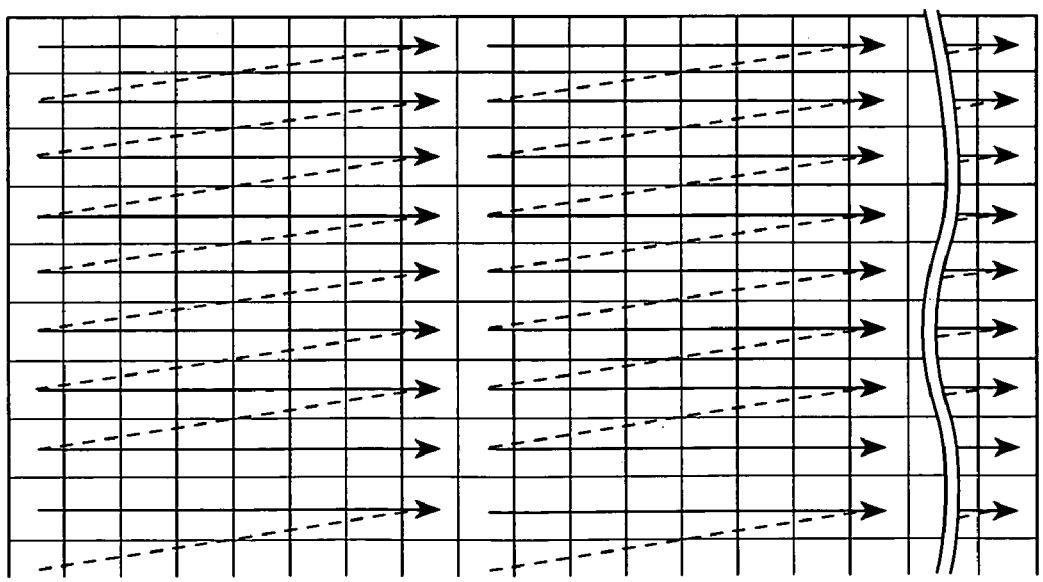
FIG. 2 is a schematic diagram illustrating a method of scanning image data in a block scanning fashion.
Figure 3:
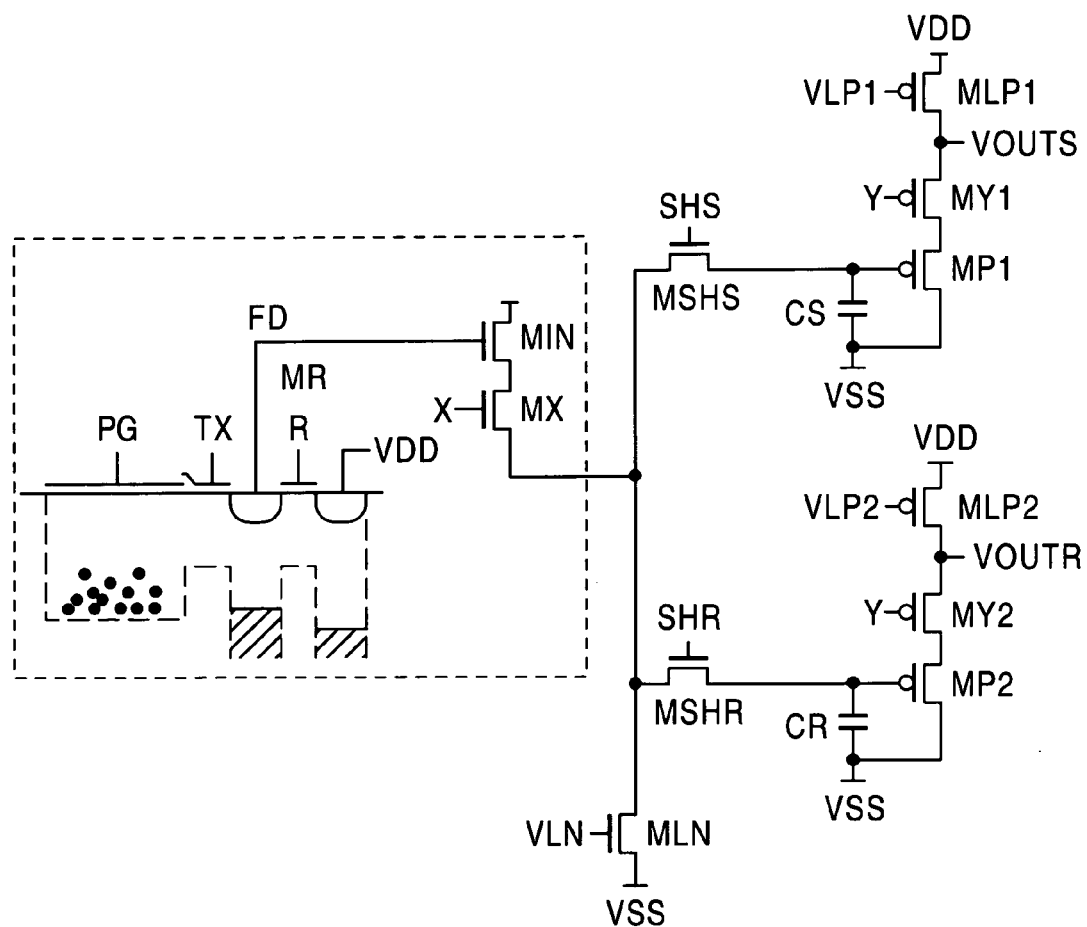
FIG. 3 is a circuit diagram illustrating the structure of a CMOS image sensor and its reading circuit according to a known technique.
Figure 4:
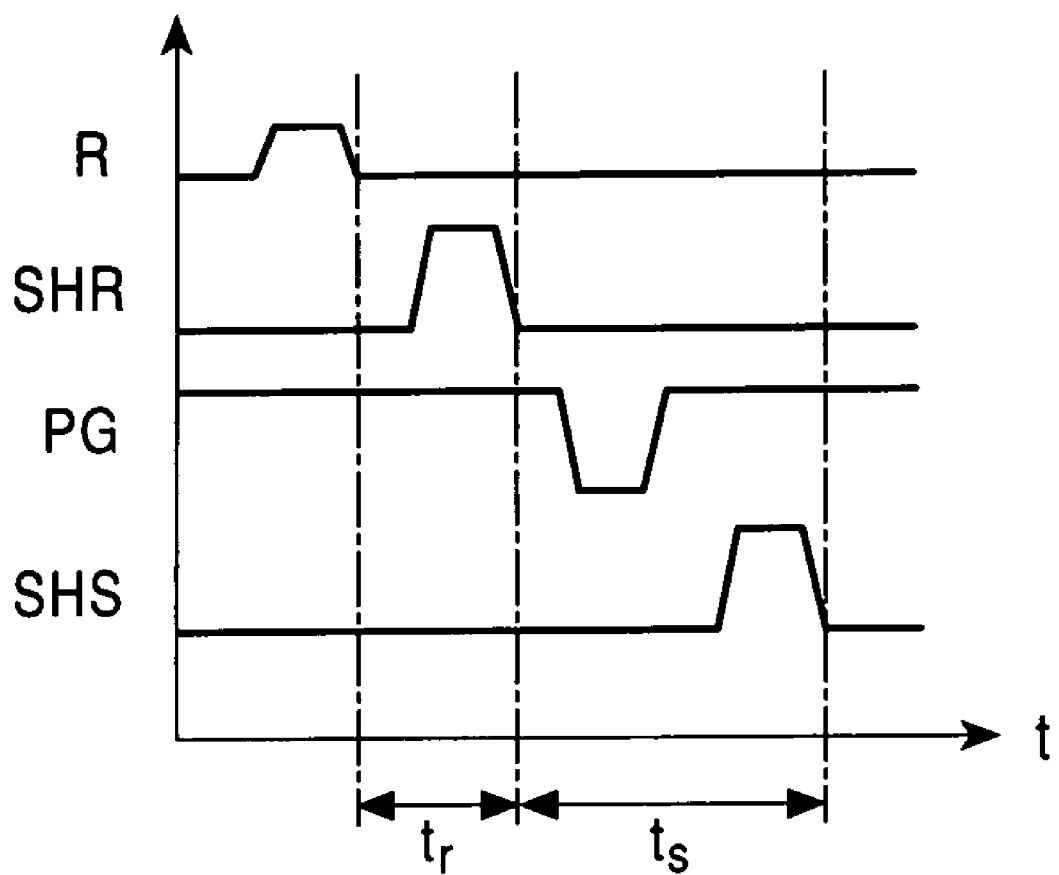
FIG. 4 is a timing chart illustrating the operation of the known reading circuit of FIG. 3.
Figure 5A:
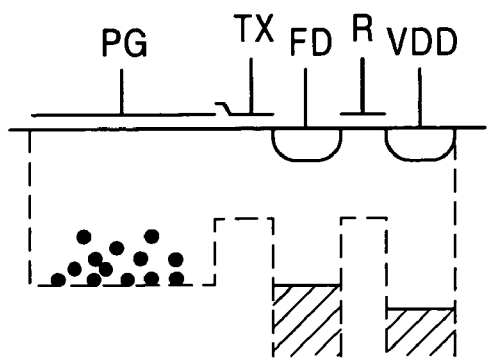
FIG. 5 is a schematic diagram illustrating the operation of the known reading circuit in conjunction with a potential image.
Figure 5B:
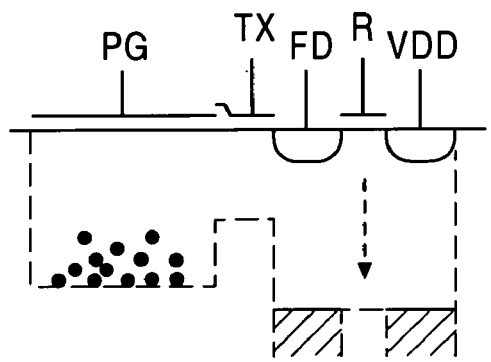
Figure 5C:
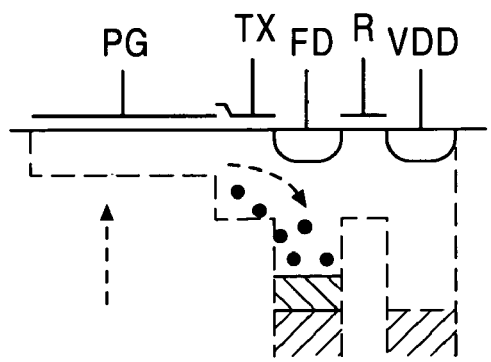
Figure 5D:
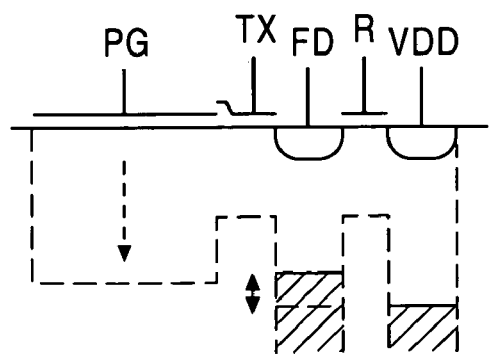
Figure 6:
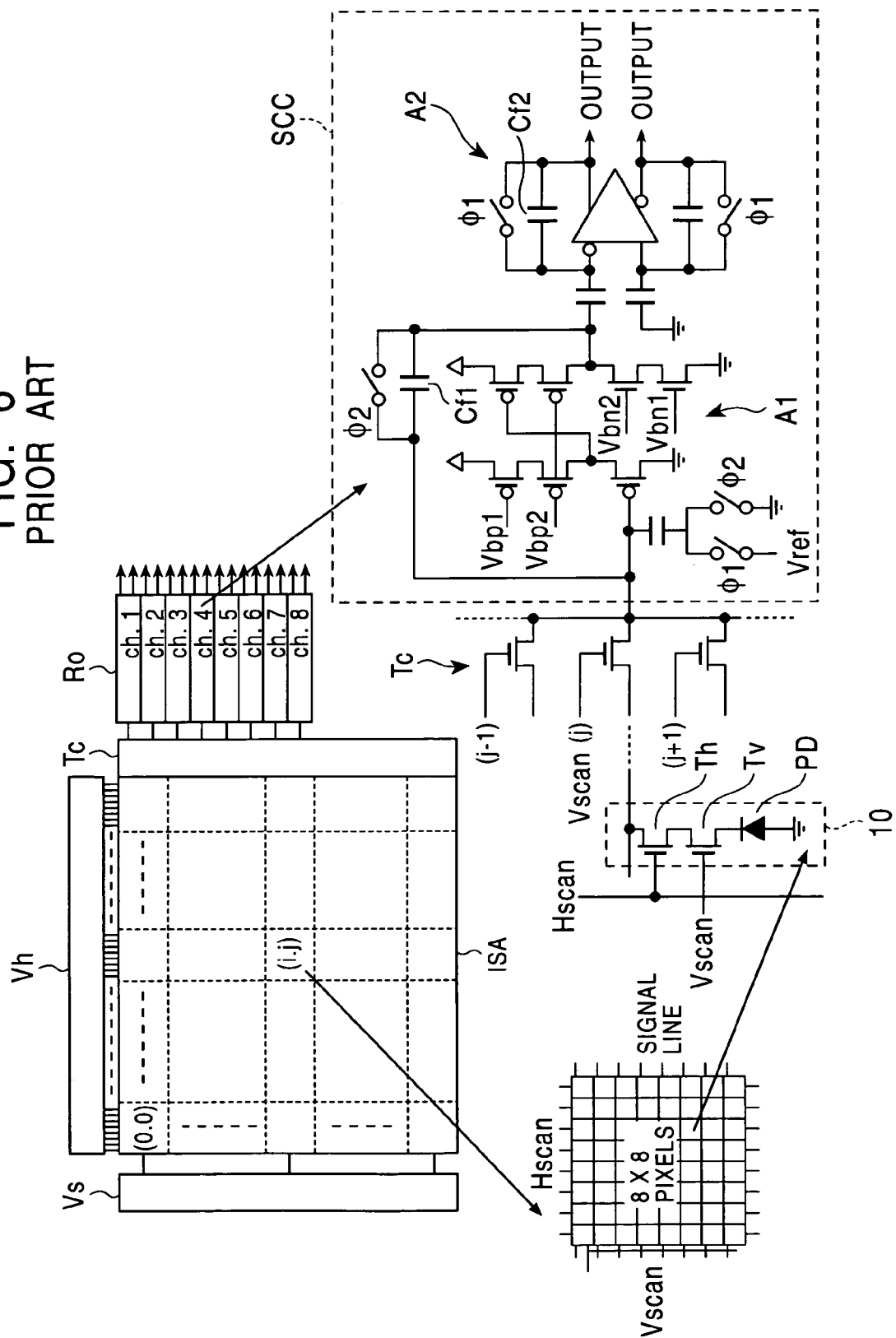
FIG. 6 is a circuit diagram illustrating the structure of a CMOS image sensor and its reading circuit according to another known technique.
Figure 7:
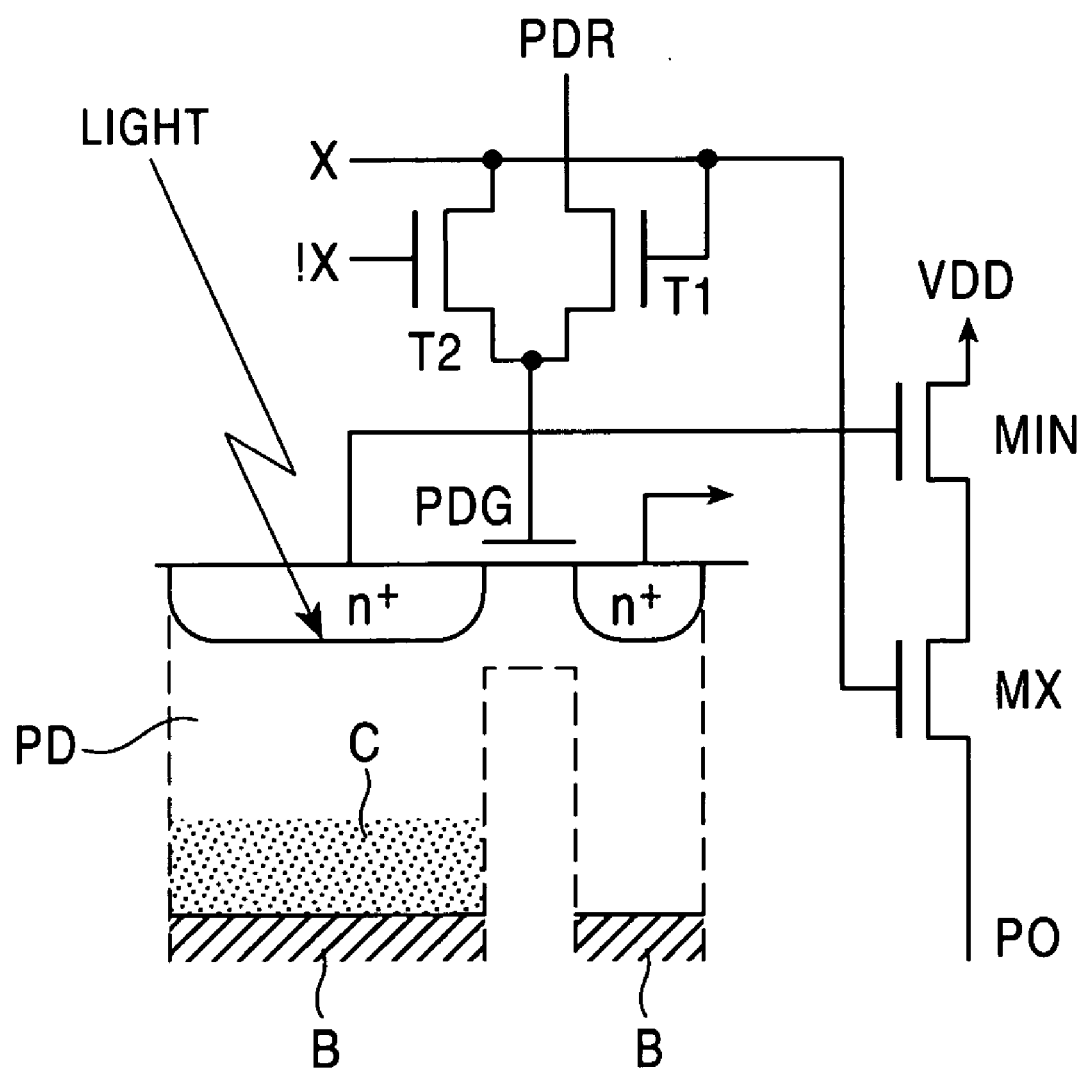
FIG. 7 is a schematic diagram illustrating the structure and associated potential image of a pixel sensor including a photodiode detection node according to a first exemplary embodiment of the present invention.
Figure 8:
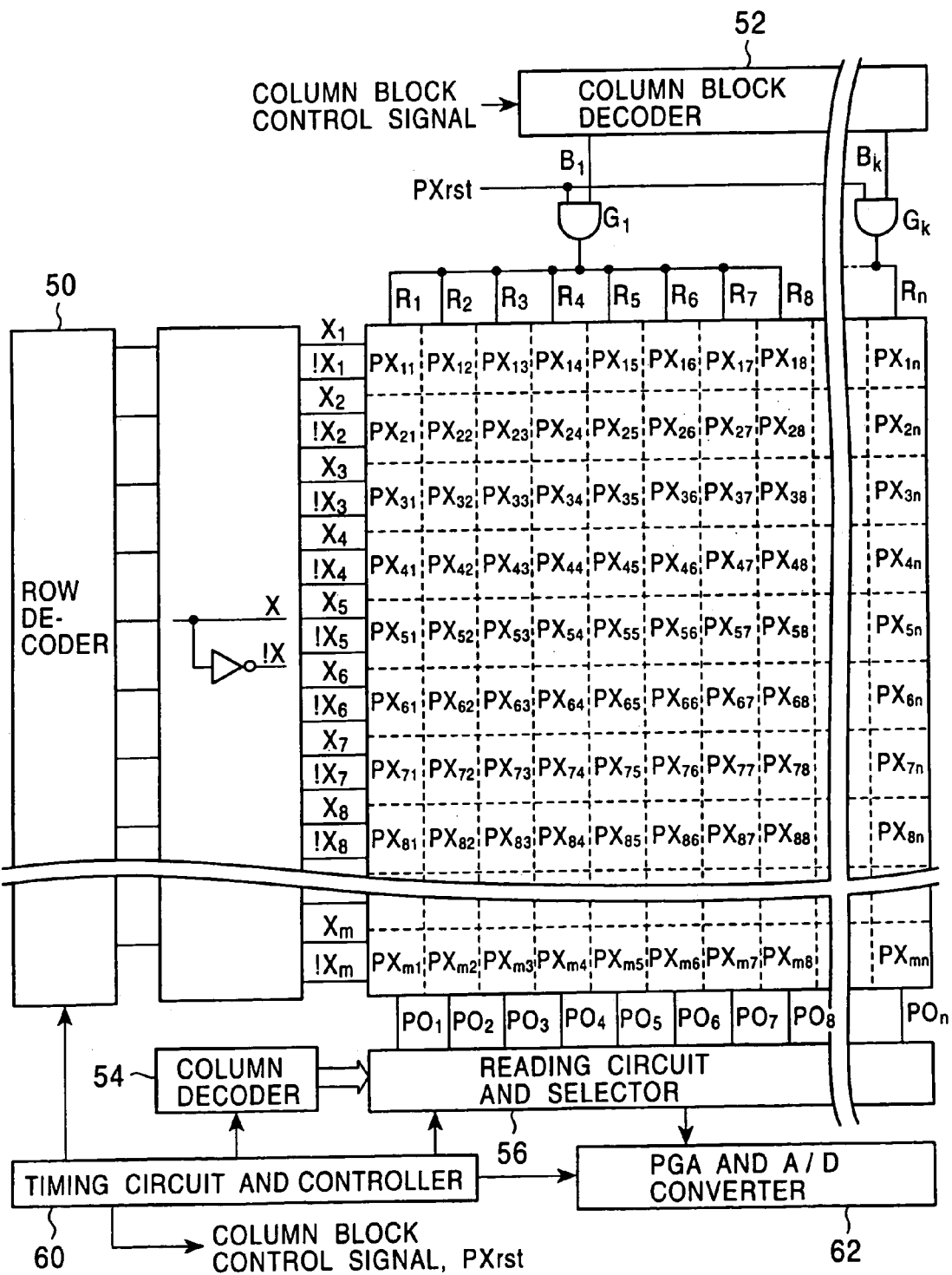
FIG. 8 is a circuit diagram illustrating the circuit configuration of an image sensor according to the first exemplary embodiment.

FIG. 7 illustrates the structure and the associated potential image of a pixel sensor according to a first embodiment of the present invention, in which a photodiode is used as a signal detection node and connected to the gate of an output transistor MIN of a source follower. The circuit of the whole image sensor is shown in FIG. 8. In FIG. 7, B denotes a base charge, C denotes a current charge, and PO denotes the output of a pixel sensor.

In the specific example shown in FIG. 7, the pixel sensor includes an NMOS transistor using a p well. Alternatively, the pixel sensor can include a PMOS transistor using an n well.

FIG. 8 illustrates an example of an image sensor 40 including a m×n array pixel sensors, wherein !X denotes an inversion of signal X.

In FIG. 7, only when a pixel sensor selection signal X supplied from a row decoder 50 shown in FIG. 8 is active, that is at a high level, a photodiode reset signal PDR is supplied, through a pair of pass transistors T1 and T2 according to the present invention, to the gate of a transistor serving to reset a photodiode PD. The pixel sensor selection signal X is coupled to an address selection signal output from the row decoder 50 and thus pixel sensors in a particular row are selected by the pixel sensor selection signal X. On the other hand, when the pixel sensor selection signal X is inactive, that is, at a low level, the signal level applied to the gate of the transistor PDG serving to reset the photodiode PD becomes low, and thus the pixel sensor is not reset.

The photodiode reset signal PDR is obtained by calculating logical AND of column block selection signals B1–Bk and the pixel reset signal PXrst using AND gates G1–Gk (k=n/8). Therefore, even in a row selected by the active pixel sensor selection signal X, a pixel in a column block that is not selected is not reset.

The AND gates G1–Gk may be replaced with NAND gates.

After completion of reading a first row (8 pixels, for example), the address selection signal for the next row is activated so as to read the next row while maintaining the block selection signal at the same level. If reading of the mth row, that is the last row, is completed, the block selection signal for the next block is activated, and reading for that block is performed starting from the first row. The above operations are generally controlled by a timing circuit and controller 60. The scanning operation can be performed in various manners. For example, after completion of reading a first block, the selection signal for the next block is activated, and reading is performed for the first row. If reading for the kth block is completed, the first block is again selected, and reading is performed for the eighth row.

In FIG. 8, reference numeral 54 denotes a column decoder, 56 denotes a reading circuit and a selector, and 62 denotes a programmable gain amplifier (PGA) and an A/D converter.

Although in the specific example shown in FIG. 8 the column block decoder 52 is disposed in a horizontal direction, and the row decoder 50 is disposed in a vertical direction, they may be placed in different positions. Furthermore, the size of one block is not limited to 8 rows by 8 columns. For example, one block can have a size of 16 rows by 16 columns.

Figure 9:
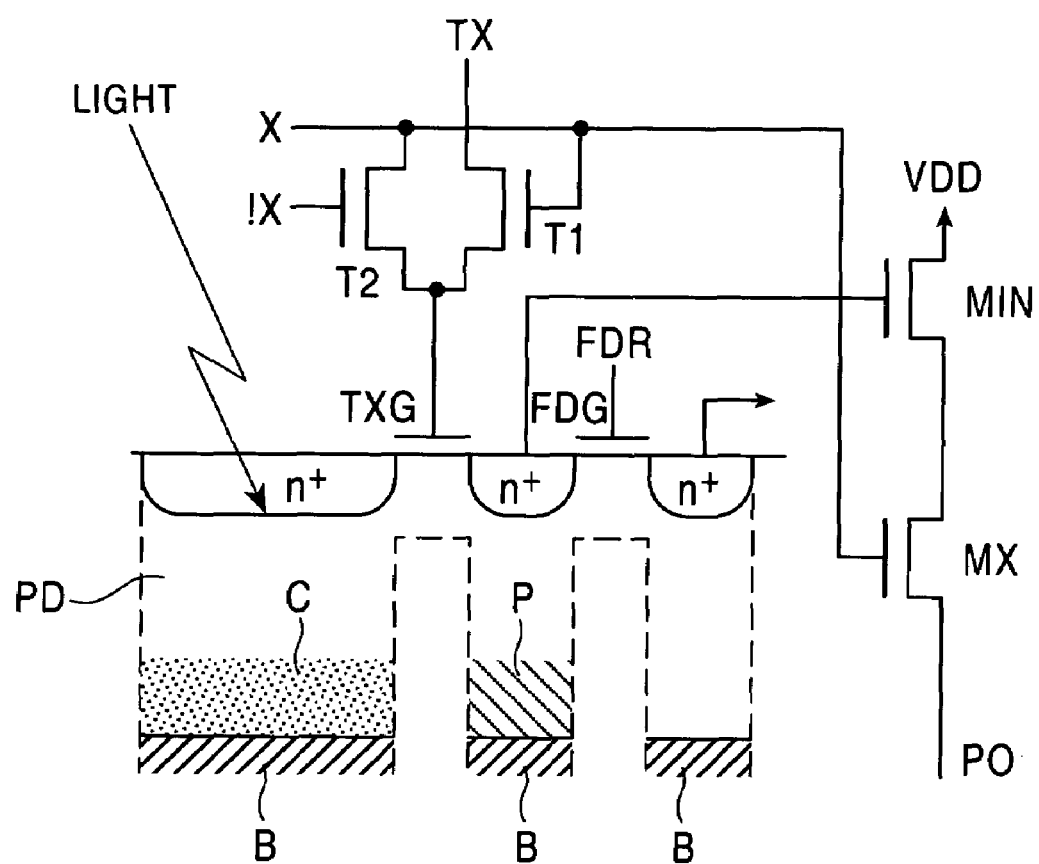
FIG. 9 is a schematic diagram illustrating the structure and associated potential image of a pixel sensor including a floating diffusion detection node according to a second exemplary embodiment of the present invention.
Figure 10:
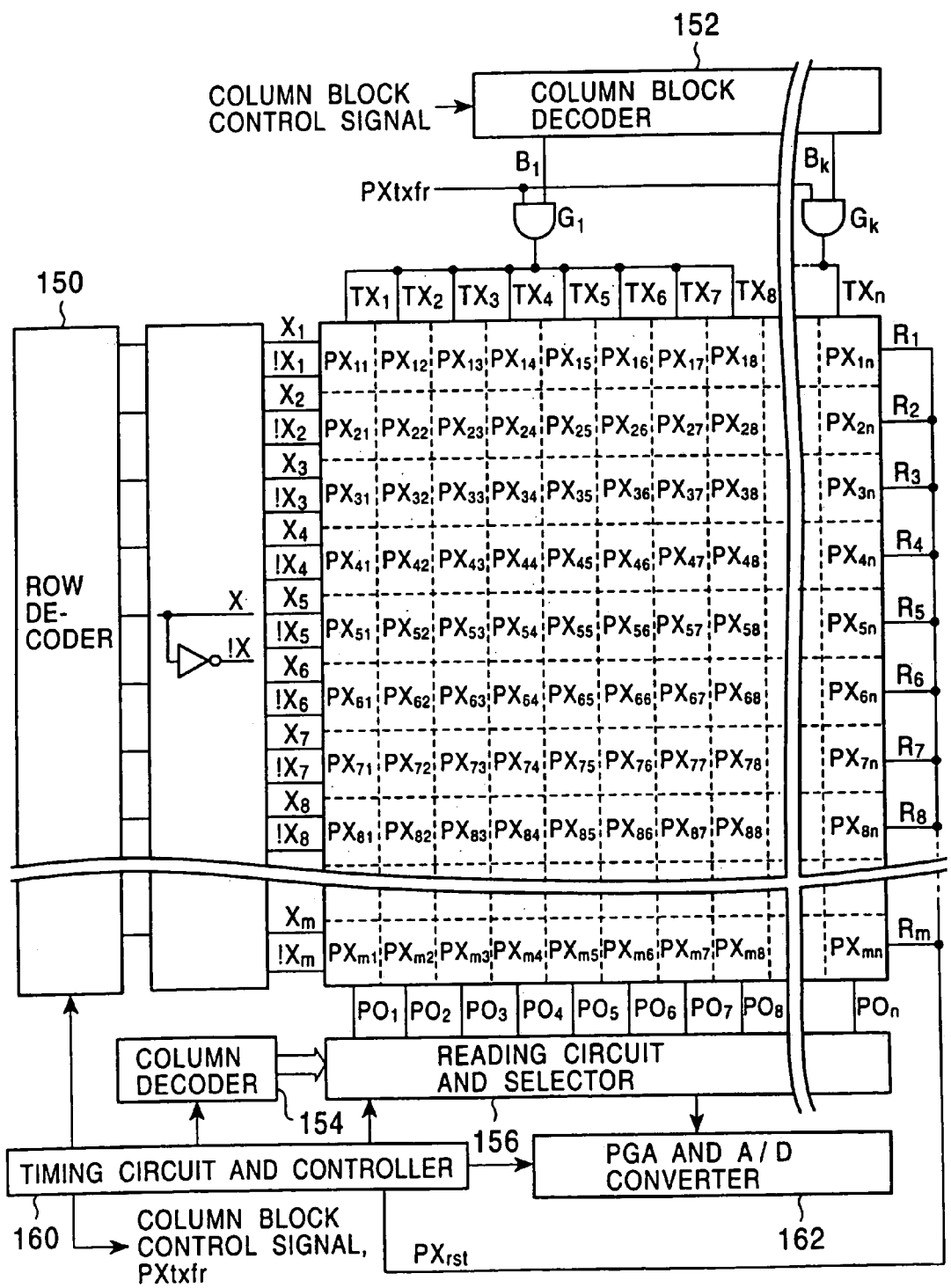
FIG. 10 is a circuit diagram illustrating the circuit configuration of an image sensor according to the second exemplary embodiment.

FIG. 9 illustrates the structure and the associated potential image of a pixel sensor according to a second exemplary embodiment of the present invention, in which a floating diffusion is used as a signal detection node and connected to the gate of an output transistor MIN of a source follower. The circuit of the whole image sensor is shown in FIG. 10. In FIG. 9, P denotes a charge remaining after a previous reading operation.

In the exemplary embodiment shown in FIG. 9, the pixel sensor includes an NMOS transistor using a p well. Alternatively, the pixel sensor can include a PMOS transistor using an n well.

Because the junction capacitance of the floating diffusion is smaller than the junction capacitance of the photodiode, it is possible to obtain higher detection sensitivity than can be obtained in the first exemplary embodiment.

In the second exemplary embodiment, only when a pixel sensor selection signal X is active, that is at a high level, a transfer signal TX is supplied through a pair of pass transistors T1 and T2 to a gate TXG of a transistor that transfers a signal charge of a photodiode PD. The pixel sensor selection signal X is coupled, as shown in FIG. 10, to an address selection signal output from the row decoder 150 and thus pixel sensors in a particular row are selected by the pixel sensor selection signal X. On the other hand, when the pixel sensor selection signal X is inactive, that is, at a low level, the signal level applied to the gate TXG of the transistor serving to transfer the signal charge of the photodiode becomes low, and thus the signal charge of the pixel sensor is not transferred.

The transfer signal TX is given as the logical AND of column block selection signals B1–Bk output from the column block decoder 152 and the pixel transfer signal PXtxfr, and the logical AND is calculated using AND gates G1–Gk. Therefore, even in a row selected by the active pixel sensor selection signal X, the signal charge of a pixel sensor in a column block that is not selected is not transferred.

Although in the exemplary embodiment shown in FIG. 10, the pixel reset signal PXrst line extends in a horizontal direction, it may alternatively extend in a vertical direction. If the logical AND between the pixel reset signal PXrst and the address selection signal is determined, and the resultant signal is supplied in the horizontal direction, then the FD reset signals FDR for rows that are not selected are not switched. This is advantageous in that noise and power consumption are reduced.

Figure 11:
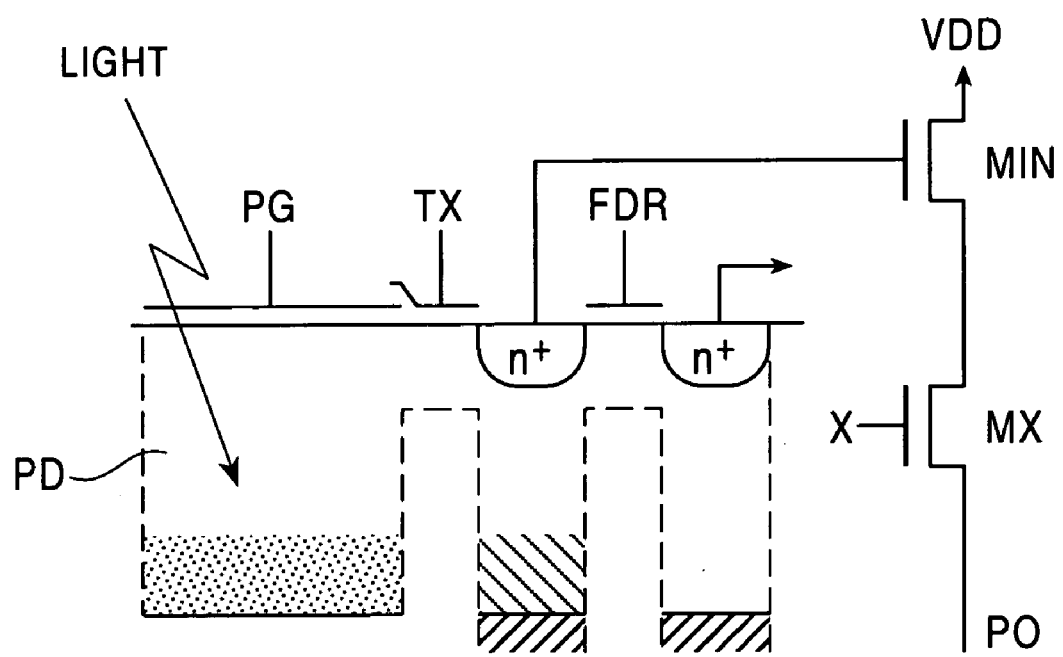
FIG. 11 is a schematic diagram illustrating the structure and associated potential image of a photogate-type pixel sensor according to a third exemplary embodiment of the present invention.
Figure 12:
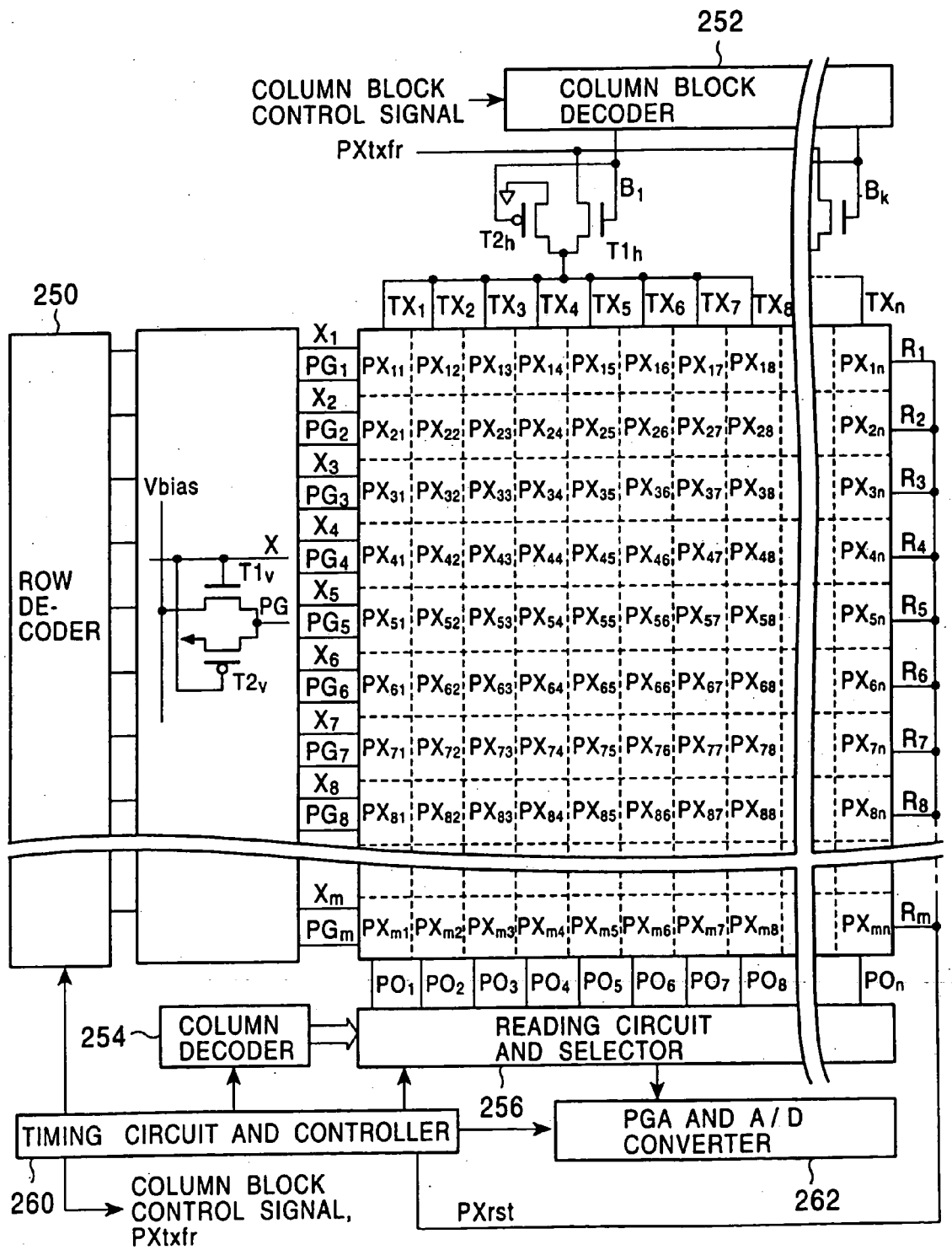
FIG. 12 is a circuit diagram illustrating the circuit configuration of an image sensor according to the third exemplary embodiment.

FIG. 11 illustrates a photogate-type pixel sensor having a similar structure to the conventional structure and also illustrates an associated potential image. FIG. 12 illustrates the whole circuit of an image sensor according to a third exemplary embodiment of the present invention. The image sensor is constructed using pixel sensors shown in FIG. 11. In the example shown in FIG. 11, the pixel sensor includes an NMOS transistor using a p well. Alternatively, the pixel sensor can include a PMOS transistor using an n well.

The third exemplary embodiment comprises a peripheral circuit, which allows pixel sensors to be block-scanned. More specifically, as shown in FIG. 12, the peripheral circuit includes a pair of pass transistors T1$v$ and T2$v$, which allow a pixel sensor selection signal X output from a row decoder 250 to be passed only when a particular row is selected, and also includes a pair of pass transistors Th1 and Th2, which allow a pixel transfer signal PXtxfr to be passed only when a particular column block is selected.

In the third exemplary embodiment, the pixel sensor selection signal X is coupled, as shown in FIG. 12, to an address selection signal output from the row decoder 250 and thus pixel sensors in a particular row are selected by the pixel sensor selection signal X. When the address selection signal is active, that is at a high level, a bias voltage Vbias is supplied to the photogate control signal PG so as to transfer the signal charge. On the other hand, when the address selection signal is inactive, that is, at a low level, the power supply voltage VDD is supplied and thus the signal charge of the pixel sensor is not transferred. Herein, the bias voltage Vbias is set to a proper value between a ground voltage GND and the power supply voltage VDD.

On the other hand, when column block selection signals B1–Bk output from the column block decoder 252 are at active high levels, a pixel transfer signal PXtxfr is supplied to the transfer signal TX thereby allowing signal charges of corresponding pixel sensors to be transferred. However, when the column block selection signals are at inactive low levels, the ground voltage GND is supplied, and thus signal charges are not allowed to be transferred. Thus, even in a row selected by the active pixel sensor selection signal X, signal charges are not transferred for pixel sensors in column blocks that are not selected.

Figure 13:
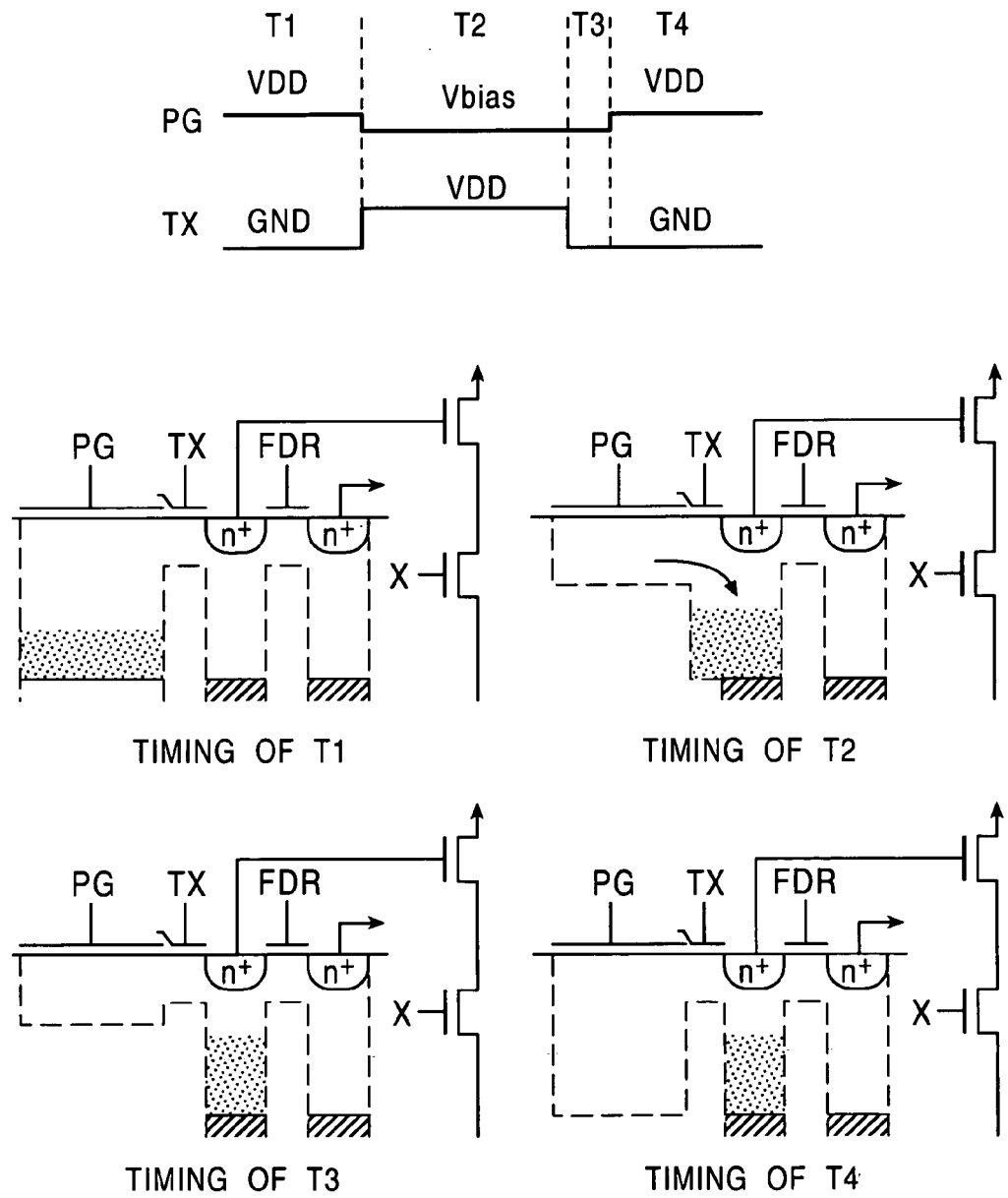
FIG. 13 is a schematic diagram illustrating the timing of a photogate control signal and a transfer signal according to the third exemplary embodiment.

In the above operation, the photogate control signal PG and the transfer signal TX for a selected pixel sensor are restricted in terms of timing. That is, as shown in FIG. 13, it is required that the transfer signal TX should fall from the power supply voltage VDD down to the ground voltage GND before the photogate control signal PG rises from the bias voltage Vbias up to the power supply voltage VDD. This requirement should be met to prevent the signal charge from moving back to the photogate after being transferred to the floating diffusion. On the other hand, the timing of the falling edge of the photogate PG and the timing of the rising edge of the transfer signal TX are not important.

Figure 14:
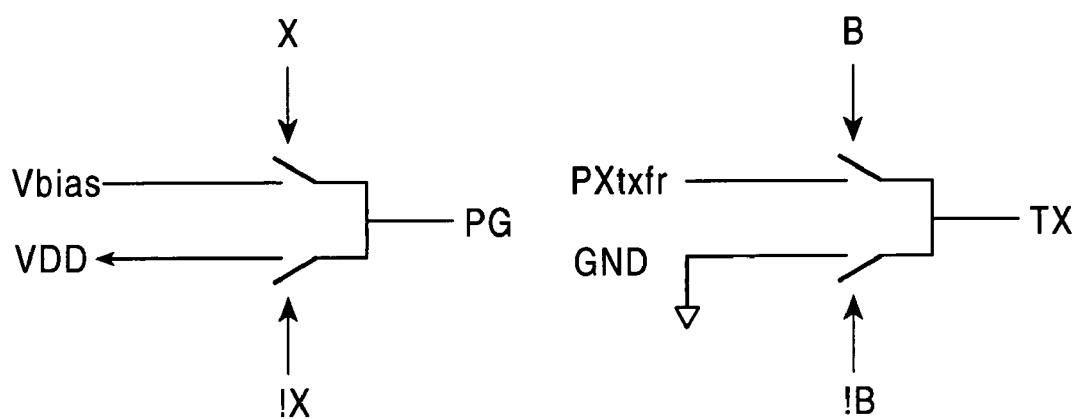
FIG. 14 is a circuit diagram illustrating a method of generating the photogate control signal and the transfer signal according to the third exemplary embodiment.

In the third exemplary embodiment shown in FIG. 12, the circuit has a simple configuration such that the photogate control signal PG and the transfer signal TX are generated using NMOS and PMOS pass transistors. However, any other suitable circuit can also be employed as long as the functions shown in FIG. 14 are realized by the circuit.

Furthermore, although in the third exemplary embodiment shown in FIG. 12, the pixel reset signal PXrst line extends in a horizontal direction, it can alternatively be disposed so as to extend in a vertical direction. If the logical AND between the pixel reset signal PXrst and the address selection signal is determined, and the resultant signal is supplied in the horizontal direction, then the FD reset signals FDR for rows that are not selected are not switched. This is advantageous in that noise and power consumption are reduced.

The reading circuit and selector 56, 156, 256 used in the respective embodiments can have a suitable construction depending on system requirements such as the number of pixels, the resolution, the operating speed, and the chip size. In particular, the selector can be constructed such that operations can be performed for eight pixels at a time according to the present invention.

Figure 15:
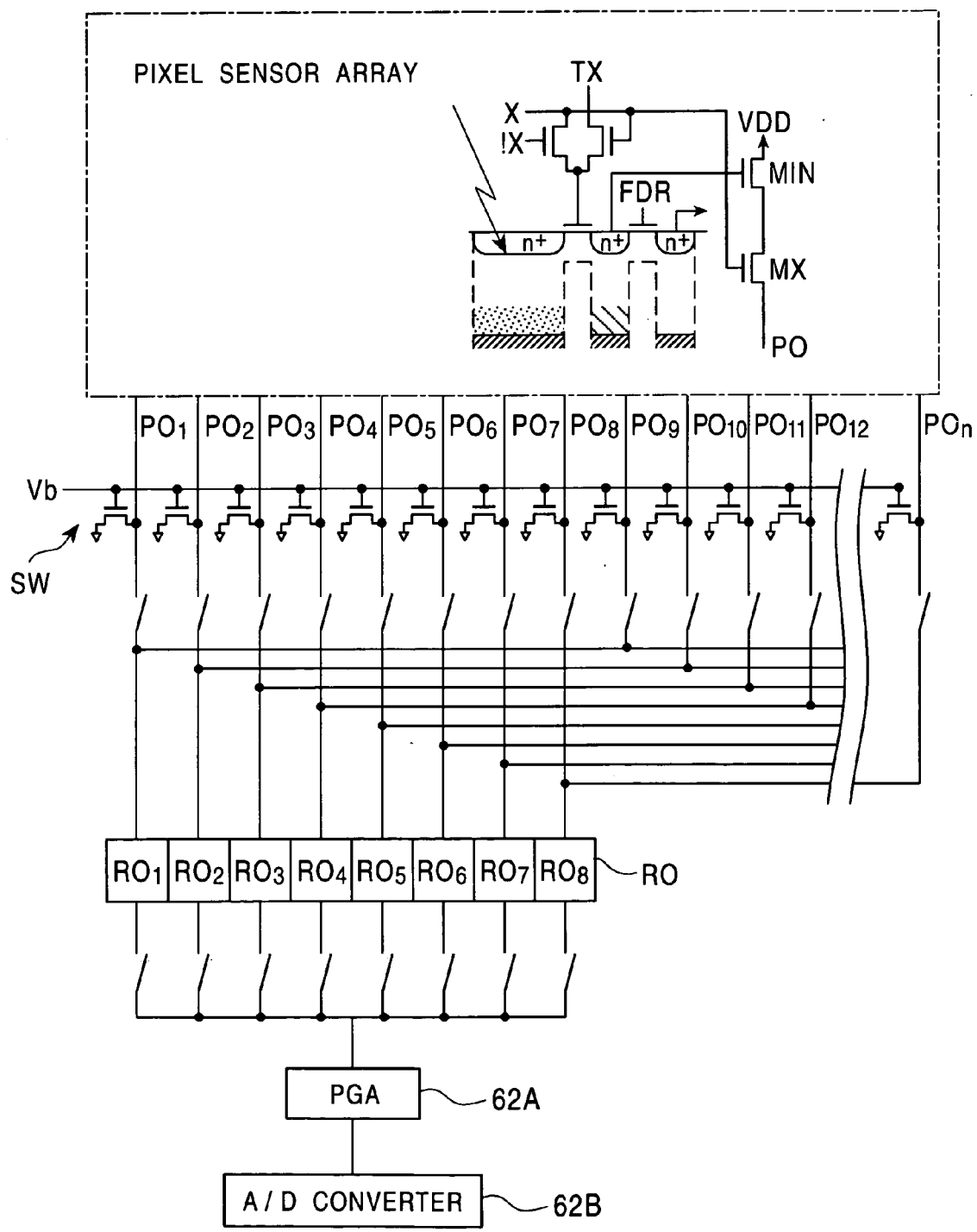
FIG. 15 is a circuit diagram illustrating an exemplary circuit configuration of a reading circuit and a selector that can be used in the respective embodiments.

FIG. 15 illustrates an exemplary embodiment of the circuit configuration of the reading circuit and selector 56, 156, 256. In this embodiment, the circuit has a simple configuration and includes eight reading circuits RO1–RO8. The reading circuits may be positioned such that there is one reading circuit corresponding to each column. However, such an arrangement results in an increase in the circuit size. In particular, a larger size is required for a part (not shown) for compensating for differences among the respective reading circuits. Only a single reading circuit can be used for all pixel sensor outputs by the use of switching. However, for a single reading circuit, it takes a long time to achieve a stable state after switching the pixel sensor output PO, and thus a high-speed operation cannot be achieved. Furthermore, an additional circuit is required for calculating the logical AND between the output of the column decoder 54, 154, 254 and the PD reset signal PDR or the transfer signal TX, and thus total circuit size becomes greater than the circuit constructed using eight reading circuits.

In the circuit shown in FIG. 15, one stage of switches SW is disposed between the outputs PO of pixel sensors to the reading circuit. However, if there are too many switches connected in parallel to each pixel sensor output PO and thus if the load is too large to the pixel sensor output, the switches can be disposed in a hierarchical structure.

This reading circuit performs correlated double sampling as disclosed in the above-described Mendis et al. paper so as to reduce noise such as random noise or fixed pattern noise of the pixel sensors and the reading circuit.

By constructing the CMOS image sensor so as to have the block scanning capability described above, preprocessing for DCT becomes unnecessary, and thus the frame memory and the block scanning circuit become unnecessary. Thus, not only can a high-speed operation be achieved, the following system operations can also be achieved.

Figure 16:
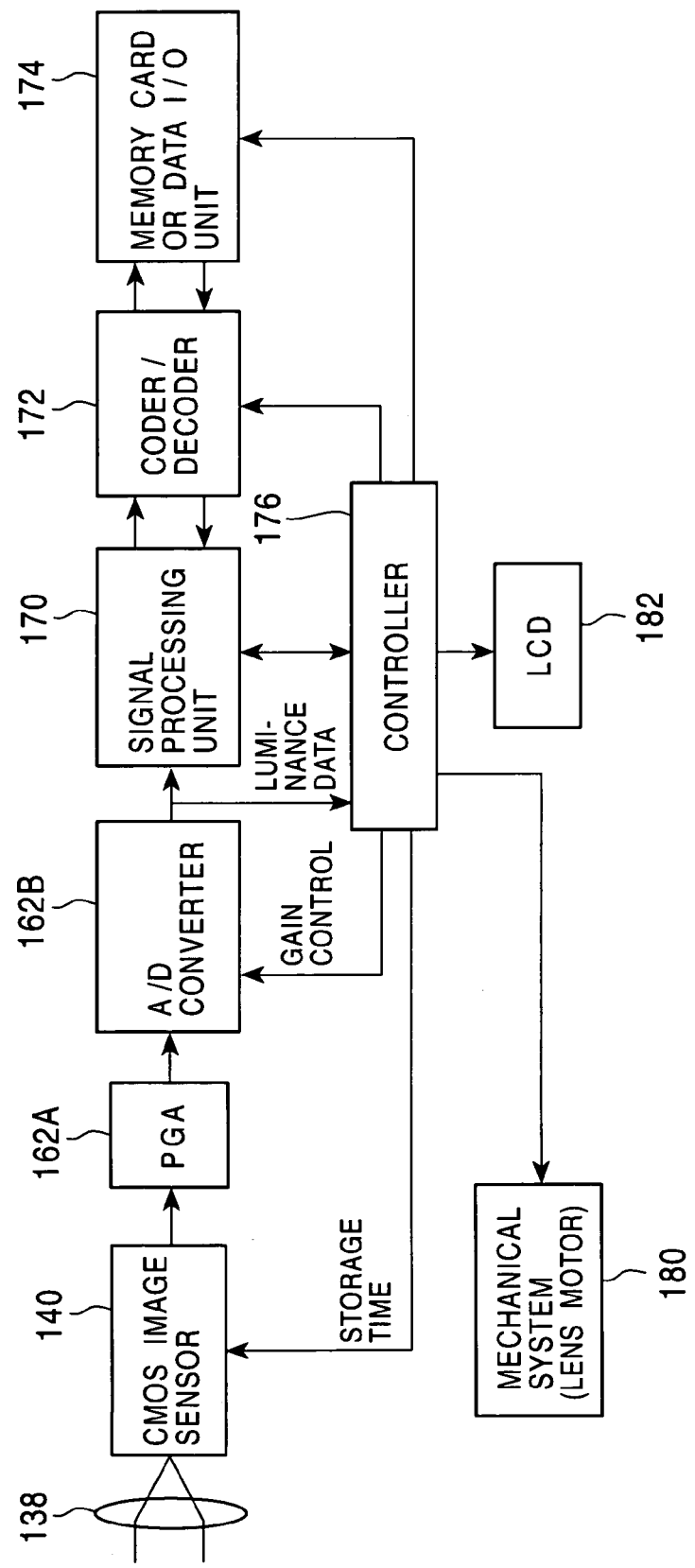
FIG. 16 is a block diagram illustrating the general construction of a camera having an automatic brightness control capability, according to a fourth exemplary embodiment of the present invention.

FIG. 16 illustrates a camera having an automatic brightness control capability, according to a fourth exemplary embodiment of the present invention. This camera is characterized in that the average brightness is estimated by reading several blocks in a central area and in a peripheral area of a screen of a CMOS image sensor 140, and the gain of the PGA 162A is automatically controlled.

As shown in FIG. 16, the camera includes an A/D converter 162B, a signal processing unit 170, a coder/decoder 172, a memory card or data I/O unit 174, a controller 176, a mechanical system 180 including a lens motor (not shown) for driving a lens 138, and a liquid crystal display (LCD) 182 for displaying an image.

Figure 17:
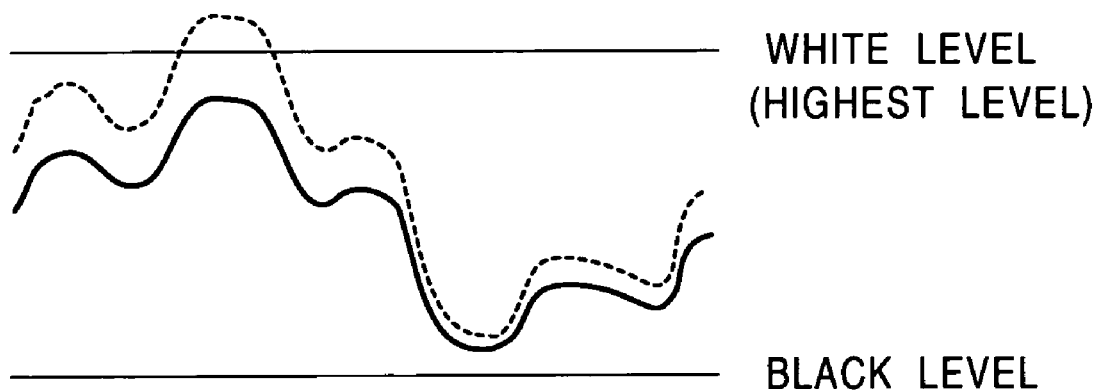
FIG. 17 is a schematic diagram illustrating the operation of the camera according to the fourth exemplary embodiment.

In the exemplary embodiment shown in FIG. 17, the automatic brightness control is performed by adjusting the gain of the PGA 162A and the charge accumulation time so that the maximum brightness of the several blocks in the central and peripheral areas of the screen becomes a selected value between the maximum and minimum allowable levels.

Thus, in this exemplary embodiment, it is possible to easily perform the automatic brightness control, and the camera is not required to have an iris.

Figure 18:
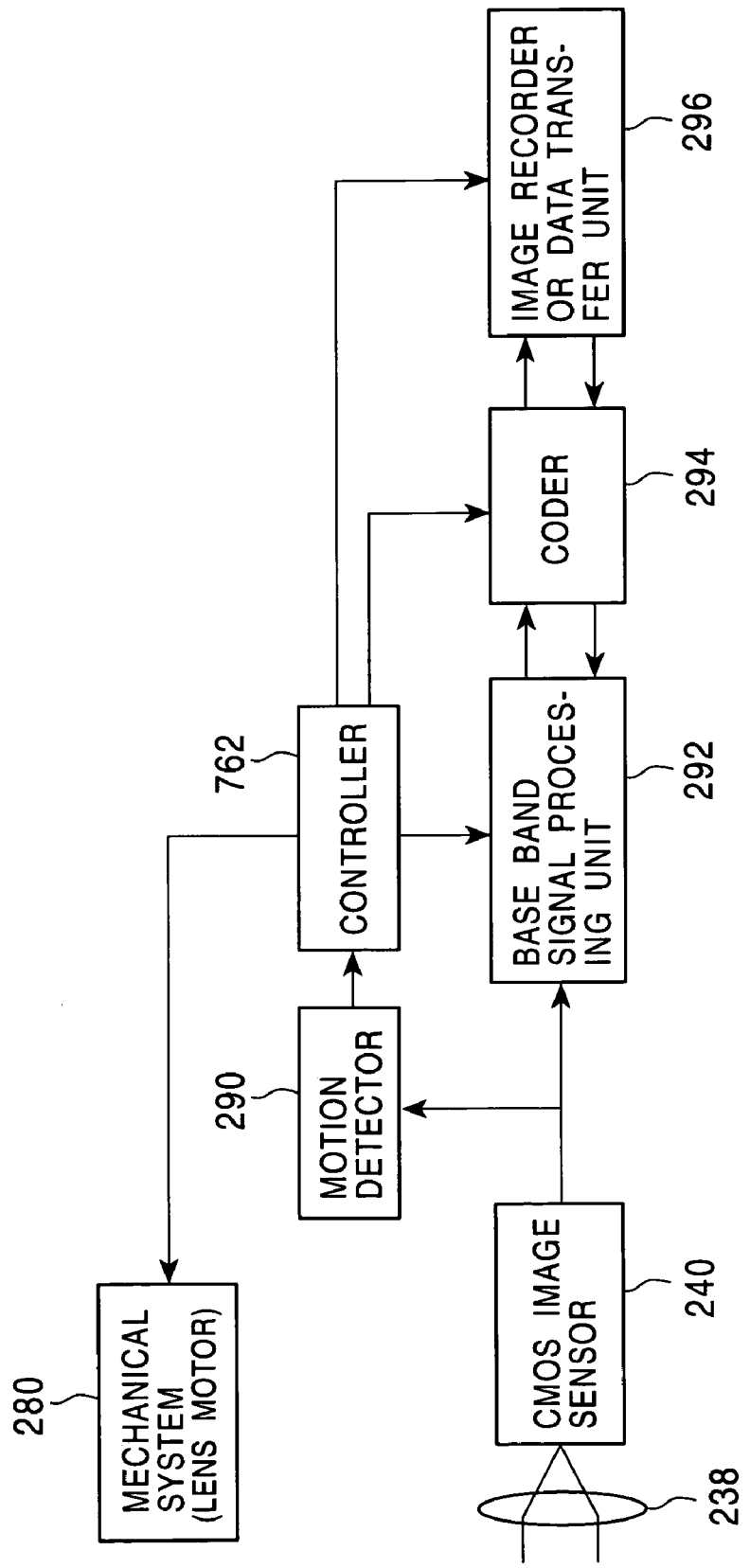
FIG. 18 is a block diagram illustrating the general construction of a monitor camera according to a fifth exemplary embodiment of the present invention.

FIG. 18 illustrates a fifth exemplary embodiment of the present invention, in which the invention is applied to a monitor camera. This monitor camera is characterized in that by reading several blocks in a central area and also in a peripheral area of a screen of a CMOS image sensor 240, an image over the entire area of the screen is continuously taken if a substantial change is detected.

As shown in FIG. 18, the monitor camera includes a motion detector 290 that detects a substantial change in an image by reading several blocks in a central area and in a peripheral area of an image screen of the CMOS image sensor 240. The monitor camera also includes a baseband signal processing unit 292, a coder 294, and an image recorder or data transfer unit 296.

According to the fifth exemplary embodiment, the monitor camera can intermittently check only a minimum required number of blocks and thus consume low amounts of electric power.

An autofocus camera according to a sixth exemplary embodiment of the present invention has a similar construction as the camera according to the fourth exemplary embodiment as described above. However, in this embodiment, focus adjustment is performed by reading several blocks in a central area of an image screen of the CMOS image sensor 240 and then an image is taken over the entire screen.

Figure 19:
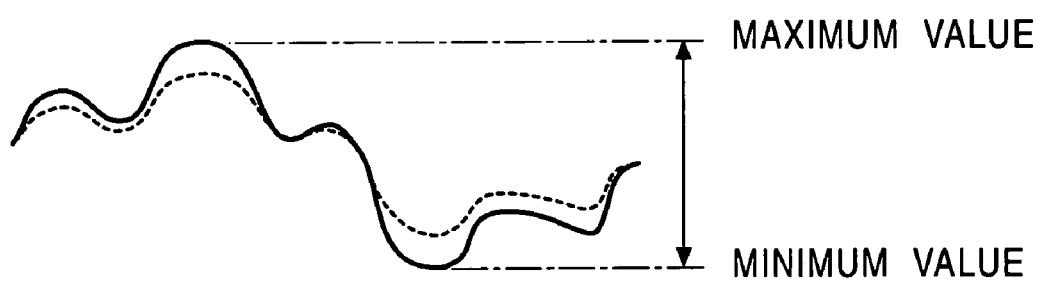
FIG. 19 is a block diagram illustrating the operation of an autofocus camera according to a sixth exemplary embodiment of the present invention.

In the sixth exemplary embodiment, the automatic focus adjustment is performed as shown in FIG. 19. That is, a lens 238 is moved, using a lens motor, to a location at which the difference between the maximum brightness and the minimum brightness detected for several blocks in the central area of the screen becomes a maximum.

In this embodiment, it is possible to automatically adjust the focus in a short time with low power consumption. Thus, the operation becomes simpler and the operation time becomes shorter.

The present invention, as can be understood from the above description, overcomes problems of the known techniques and provides important advantages. Namely, a DCT operation can be easily performed at a high speed without needing a preprocessing circuit. An image can be compressed according to the JPEG standard without using a high-capacity frame memory for raster scanning. Further, because an absolute value of each pixel sensor is output, it is possible to perform an additional process such as color correction, point defect compensation, motion detection, and the like. Also, because each pixel sensor can be reset, it is possible to reduce random noise by correlated double sampling.

What is claimed is:

1. A CMOS image sensor, comprising:
    pixel sensors arranged in the form of a two-dimensional array, each pixel sensor comprising a photodiode at a signal detection node and a pair of pass transistors, which passes a photodiode reset signal to a gate of a transistor that resets said photodiode, only when said pixel sensor is selected;
    means, disposed in each pixel sensor, for obtaining a signal whose reset noise is reduced and that corresponds to the absolute value of the amount of incident light; and
    means for outputting said signal in a block-scanning fashion
    wherein said photodiode reset signal is given as the logical AND of a column block selection signal and a pixel reset signal.

2. A CMOS image sensor, comprising:
pixel sensors arranged in a two-dimensional array, each pixel sensor comprising floating diffusion at a signal detection mode and a pair of pass transistors, which passes a transfer signal to a gate of a transistor that transfers a signal charge of a photodiode, only when said pixel sensor is selected;
means, disposed in each pixel sensor, for obtaining a signal whose rest noise is reduces and that corresponds to the absolute value of the amount of incident light; and
means for outputting said signal in a block-scanning fashion;
wherein said transfer signal is given as the logical AND of a column block selection signal and a pixel transfer signal.

3. A CMOS image sensor comprising:
a pixel sensor according to claim 1; and
means for selectively connecting the output of the pixel sensor to a circuit for reading one row of block.

4. A CMOS image sensor comprising:
a pixel sensor according to claim 2; and
means for selectively connecting the output of the pixel sensor to a circuit for reading one row of block.

5. A camera that automatically controls brightness, comprising:
a CMOS image sensor according to claim 1;
means for estimating the average brightness over an entire screen of said CMOS image sensor from brightness detected for a several blocks in a central area and in a peripheral area of the screen; and
a programmable gain amplifier having a gain that is automatically controlled in accordance with the estimated brightness.

6. A camera that automatically controls brightness, comprising:
a CMOS image sensor according to claim 2;
means for estimating the average brightness over an entire screen of said CMOS image sensor from brightness detected for a several blocks in a central area and in a peripheral area of the screen; and
a programmable gain amplifier having a gain that is automatically controlled in accordance with the estimated brightness.

7. A camera that automatically controls brightness, comprising:
a CMOS image sensor according to claim 3;
means for estimating the average brightness over an entire screen of said CMOS image sensor from brightness detected for a several blocks in a central area and in a peripheral area of the screen; and
a programmable gain amplifier having a gain that is automatically controlled in accordance with the estimated brightness.

8. A monitor camera, comprising:
a CMOS image sensor according to claim 1;
means for detecting whether there is a substantial change in an image by reading several blocks in a central area and in a peripheral area of an image screen of said CMOS image sensor; and
means for continuously taking an image over the entire screen when a substantial change is detected.

9. A monitor camera, comprising:
a CMOS image sensor according to claim 2;
means for detecting whether there is a substantial change in an image by reading several blocks in a central area and in a peripheral area of an image screen of said CMOS image sensor; and
means for continuously taking an image over the entire screen when a substantial change is detected.

10. An autofocus camera, comprising:
a CMOS image sensor according to claim 1;
means for adjusting focus by reading several blocks in a central area of an image screen of said CMOS image sensor; and
means for taking an image over the entire screen after completion of the focus adjustment.

11. An autofocus camera, comprising:
a CMOS image sensor according to claim 2;
means for adjusting focus by reading several blocks in a central area of an image screen of said CMOS image sensor; and
means for taking an image over the entire screen after completion of the focus adjustment.

12. An autofocus camera, comprising:
a CMOS image sensor according to claim 3;
means for adjusting focus by reading several blocks in a central area of an image screen of said CMOS image sensor; and
means for taking an image over the entire screen after completion of the focus adjustment.

* * * * *